March 1, 1966  D. S. STRADER  3,237,636
CONTROLLED PRESSURE BY PASS VALVE
Filed Jan. 22, 1962
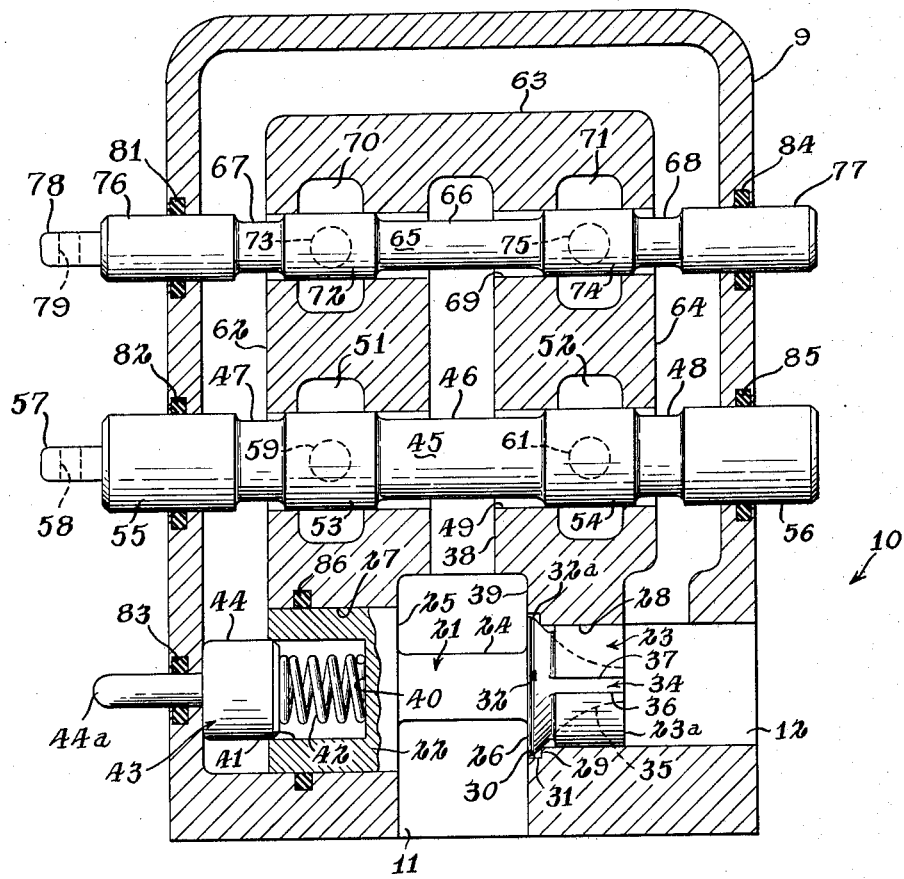
INVENTOR
DON S. STRADER

3,237,636
CONTROLLED PRESSURE BY PASS VALVE
Don S. Strader, Mount Prospect, Ill., assignor to The Frank G. Hough Co., a corporation of Illinois
Filed Jan. 22, 1962, Ser. No. 167,719
2 Claims. (Cl. 137—115)

This invention relates to a valve body providing a controlled pressure bypass valve in combination with one or more control valves using the same pressure fluid flow from an inlet and outlet port, and is more particularly concerned with a controlled pressure bypass valve that assures constant volume fluid flow from a constant volume fluid source during any operative position of one or more control valves.

Normally in hydraulic circuits having constant volume circulation of fluid an open center valve has been used since there is provided a continuous passage through the hydraulic circuit during the operative positions of the open center valve. However, in many hydraulic circuits it would be desirable to employ a closed center valve because of the superior characteristics provided by this type of valve. The conventional closed center valve provides no open circuit for any continuous circulation of fluid when the valve is in one of its operative positions, namely, the closed position. Previously, to use a closed center valve, a variable volume power supply is required that is complex, expensive and in many cases unreliable. Therefore, in order to use a closed center valve in a hydraulic circuit it is desirable to provide a continuous circulation of fluid flow during any operative position particularly the closed position of the closed center valve that equals the flow from a constant volume source.

It is the object of the present invention to provide a bypass valve in combination with a closed center control valve that will provide circulation of pressure fluid flow through the hydraulic circuit during closed position of the closed center valve.

It is another object of the present invention to provide a bypass valve of simple construction and long service life in combination with a closed center control valve to provide a constant volume of pressure fluid flow through the hydraulic circuit.

It is a further object of the present invention to provide a controlled pressure bypass valve in combination with a closed center control valve in a hydraulic circuit such that the bypass valve is urged into an open position by the circulating pressure fluid flow when the control valve is in a closed or non-flow position.

Still another object of the present invention is to provide a controlled pressure bypass valve in combination with a closed center control valve in a constant volume fluid flow hydraulic circuit such that upon movement of the closed center valve to an open position, the controlled pressure bypass valve is urged in a direction by a greater force opposing the circulating pressure fluid force to close the bypass valve.

It is another object of the present invention to provide a controlled pressure bypass valve in combination with a closed center control valve such that a continuous circulation of pressure fluid flow from a constant volume fluid pump in the hydraulic circuit is maintained during all operating conditions, and that the movement of the control valve to substantially closed position and the movement of the actuating means of the controlled pressure bypass valve to increase the resilient force, the fluid flow acting on the controlled pressure bypass valve results in a fluid force greater than and opposing the increased resilient force to open the closed bypass valve to assure continuous circulation of fluid flow through the valve body that equals the flow of the constant volume of the pump.

Further another object of the present invention is to provide a valve body including a controlled pressure bypass valve having end sections of different diameter in combination with one or more closed center control valves in a constant volume fluid flow hydraulic circuit such that the movement of one or more control valves to an open position and the simultaneous movement of an actuating means connected to the controlled pressure bypass valve to urge the bypass valve to a closed position, such that if the rate of fluid flow through one or more of the open control valves is not substantially equal to the capacity of the constant volume pump in the circuit, the closed controlled pressure bypass valve is opened by the reaction of the greater fluid force on the different end sections against the force of the actuating means to equalize the rate of fluid flow through the valve body with the capacity or rate of flow of the constant volume pump in the circuit.

Other objects and features of the present invention will be apparent upon a perusal of the following specification and drawings of which:

FIGURE 1 is a schematic view of the hydraulic circuit showing the relationship of the various parts; and FIGURE 2 shows the valve body of FIGURE 1 partly in longitudinal cross section to illustrate the present invention.

The present embodiment is the preferred embodiment but it is to be understood that changes can be made in the present embodiment by one skilled in the art without departing from the spirit or scope of the present invention.

For a general description of the present invention, reference is made to the drawings. The present invention comprises a hydraulic circuit wherein a constant volume fluid pump is employed to provide a continuous flow through an inlet and outlet port of a valve body. Within the valve body a controlled pressure bypass valve in combination with one or more closed center control valves provides assurance of a continuous fluid flow of constant volume therethrough. An inlet fluid passageway including a connection between a bypass valve and the closed center control valves provides continuous fluid flow communication to the outlet port through the bypass valve or through the closed center control valves when moved to their opened position. Through an operating means, not shown, the closed center control valves are selectively movable to the opened and closed position along with movement of an actuating means including a spring connected to the bypass valve to assure proper closing of the bypass valve against the action of the pressure fluid flow. In FIGURE 2, the closed center control valves and the controlled pressure bypass valves are illustrated in the closed position such that if any fluid flow is present, the fluid force acting upon the radial faces of the bypass valve end sections in the inlet passageway urges against the spring force of the bypass valve to urge the bypass valve to an open position so as to maintain continuous fluid flow in the hydraulic circuit.

For a detailed description of the present invention, continued reference is made to the drawings. The hydraulic fluid circuit 10 in FIGURE 1 comprises a valve body 9 having inlet port 11 and outlet port 12 connected in series to a constant volume fluid pump 13 and a sump or reservoir 14 through conduits 15, 16 and 18. The pump 13 and reservoir 14 supply the continuous constant volume fluid flow to the valve body 9 during any position of the valves therein. Further in FIGURE 1 control devices 60 and 80 of any suitable construction known in the art are each connected across control ports 59, 61 and 73, 75 through respective conduits 59a, 61a and 73a, 75a.

Turning to FIGURE 2, immediately next to the inlet port 11 in the valve body 9 is the controlled pressure bypass valve 21 having end sections 22 and 23 connected by a reduced portion 24. The end sections 22 and 23 are of different diameter such that the end setcion 22 is of greater diameter and both sections slidably move longitudinally in a chamber having an upper portion 27 having a larger diameter than a lower portion 28. Radial faces 25 and 26 of the end sections 22 and 23 are contacted by the pressure fluid flow circulating through the valve body 9. The radial face 25 is of a larger area than the radial face 26 since it is on the larger diameter end section 22 whereby the difference in area on radial faces 25 and 26 provides a resultant fluid force in a longitudinal axial direction to the left in FIGURE 2.

The bypass valve portion 32 of the valve 21 is provided on the end section 23 such that chamber portion 28 has a counterbore 30 of smaller diameter than the larger chamber portion 27. This counterbore 30 includes shoulder face 29 and circular wall 31. Underneath the inlet fluid contacting face 26, a conical shaped valve face 32a extending from the peripheral edge of face 26 to the annular reduced portion 33 which connects with the end section 23. In FIGURE 2 bypass valve portion 32 is shown in the closed position such that the valve face 32a is seating on the counterbore valve seat shoulder face 29 prevention passage of any pressure fluid flow from inlet port 11 to outlet port 12. However, if the bypass valve portion 32 is moved to an opened position to the left in the drawing away from its shoulder face 29 fluid from the inlet port will flow between the valve face 32a and the counterbore 30 to the end section 23 and pass therethrough through a series of longitudinal grooves 34 to the outlet port 12. Four grooves 34, three of these grooves 34 ar substantially shown in FIGURE 2, are formed equidistantly around the end section 23 and include parallel spaced-apart chordal walls 36 and 37 connecting bottom arcuate shaped wall, shown in two of the grooves 34 by the invisible line 35 extending tangentially from the conical valve face 32a to the right face 23a of end section 23. Therefore, when the bypass valve is in an opened position continuous fluid flow can be maintained between the counterbore 30 and conical bypass valve face 32a, and through grooves 34 to the outlet port 12. However, if necessary, larger or more grooves such as grooves 34 could be provided to assure sufficient continuous fluid pressure flow.

The inlet passageway 38 having an enlarged portion 39 adjacent the fluid faces 25 and 26 extends to be connected with the inlet port 11 and to the closed center control valves 45 and 65. To the left of the larger fluid contacting face 25 in the drawing there is provided a bore 41 with a spring 42 of less diameter mounted therein against the bottom face 40. An actuating means 43 having a diametrical portion 44 of the same diameter as the bore 41 contacts the spring 42 at one end, and at the other end the actuating means 43 has a reduced diametrical portion 44a extending beyond the wall of the valve body 9 to be actuated by an operating means, not shown. Normally the spring 42 provides a resilient force in the longitudinal axial direction to the right in FIGURE 2 to urge the bypass valve portion 32 into a closed position against seat 30 and counteracts the resultant fluid force on radial forces 25 and 26. However, the purpose of the actuating means 43 when moved by the operating means is to increase the resilient force of spring 42 so as to be greater than the resultant fluid force acting on faces 25 and 26 to assure closed position of the bypass valve portion 32.

Considering next the control valves 45 and 65 which are different in diametrical dimension but each being of the closed center construction. The first valve 45 has a reduced portion 46 with land portions 53 and 54 at either end. Outermost reduced portions 47 and 48 of lesser length are connected to the innermost land portions 53 and 54 and, in turn, at their outer ends they are connected to the outermost land portions 55 and 56 with the one outermost land portion 55 providing a reduced extension portion 57 including the transverse bore 58 for connection to an operating means. The valve 45 is longitudinally movable in a chamber bore 49 having spaced-apart annular grooves 51 and 52 of a larger diameter adjacent the land portions 53 and 54 of the valve. The grooves 51 and 52 are further connected to control ports 59 and 61 shown in invisible lines which are connected to a control device 80 through conduits 59a and 69a shown in FIGURE 1.

The other valve 65 is of similar construction having a reduced portion 66 connected at either end to inner land portions 72 and 74 that are longitudinally movable in the chamber 69. A pair of outermost reduced portions 67 and 68 of lesser length are connected to the inner land portions 72 and 74, and the outermost land portions 76 and 77 are connected to the reduced portions 67 and 68. The outermost land portion 76 provides a reduced extension portion 78 including the transverse bore 79 extending outwardly to connect to an operating means. Spaced-apart annular grooves 70 and 71 of larger diameter than the chamber 69 provide connection to the control ports 73 and 75 shown by the invisible lines to connect with another control device 60 shown in FIGURE 1 through conduits 73a and 75a. Both valves 45 and 65 shown in their closed position in FIGURE 2 with their reduced portions 46 and 66 in parallel fluid flow communication with the inlet passageway 38. The outermost reduced portions 47, 48 of valve 45 and outermost reduced portions 67, 68 of valve 65 are shown in an outer passageway 62, 63 and 64 of the valve body 9 that connects with the outlet port 12 adjacent the chamber portion 28 of the controlled pressure bypass valve portion 32. To prevent any fluid leakage out of the valve body 9 during operation, O-rings 81 and 84 are provided in counterbores not indicated of the valve body 9 for contacting the outermost land portions 77 of valve 65; similarly O-rings 82 and 85 for outermost land portions 55 and 56 of valve 45 and finally O-rings for the valve 21, namely, O-ring 83 on its reduced extension portion 44a and O-ring 86 in chamber portion 27 to prevent pressure fluid flow leakage from the inlet passageway 38 between the chamber portion 27 and the end section 22 to the outlet passageway 62 that is connected to the outlet port 12 through passageways 63 and 64.

In view of the foregoing detailed discussion an operation of the hydraulic circuit will now be set forth below. Assuming that the closed center control valves 45 and 65 are in closed position, as shown, the pressure fluid flow entering inlet port 11 provides a back pressure in the inlet passageways 38 and 39 acting on faces 25 and 26 to cause a resultant fluid force in a longitudinal axial direction to the left in the drawing to urge and move the bypass valve portion 32 to an opened position against the counteracting resilient force of spring 42. During opened position of the controlled pressure bypass valve portion 32, pressure fluid flow from inlet port 11 passes through grooves 34 in end section 23 to the outlet port 12. Since the other valves 45 and 65 are in a closed position preventing pressure fluid flow therethrough, the rate of pressure fluid flow from inlet port 11 through opened bypass valve portion 32 and grooves 34 should be sufficient to meet the capacity or rate of flow of the constant volume pump 13 in the hydraulic circuit 10.

As mentioned previously the ports 59 and 61, 73 and 75 in each control valve chamber 49 and 69 are each connected to their respective control device for supplying the pressure fluid flow from the inlet passageway 38. If the control valve 45 is moved to the right to an opened position, fluid flow from the inlet passageway passes between the reduced portion 46 and chamber 49 to the annular groove 52 which has port 61 connected thereto. While the control valve 45 is moved to the right, pressure fluid flow from the port 61 to the control device 80 passes through the other port 59 connected to annular groove 51, and between the outermost reduced portion 47 and chamber 49 to the outer passageway 62 connected to the outlet port 12 through connecting passageways 63 and 64. Thus pressure fluid flow passes through the control device 80 from port 61 to port 59. Similarly, if the control valve 45 is moved to the left to an opened position pressure fluid flow from passageway 38 is passed between outermost reduced portion 46 and chamber 49 and through port 59 to the control device 80; and the outlet fluid flow from the control device through the port 61 through the outermost reduced portion 48 to the passageway 64 connected to the outlet port 12. Thus continuous fluid flow can be maintained through the valve 45 when moved to an opened position to the left or to the right from the closed position as shown in FIGURE 2.

The second valve 65 differing only in that it is of smaller diameter operates in the same manner as valve 45 when moved to an opened position to the left or to the right provides inlet fluid flow from passageway 38 to one of ports 73 and 75 connected to the other control device 60. Thus when valve member 65 is moved to an opened position to the left, the reduced portion 66 provides fluid flow from inlet passageway 38 to control port 73 in chamber groove 70. Since only one of the ports 73 or 75 can be an inlet port from passageway 38 for the left opened position the outermost reduced portion 68 cooperates with groove 71 to provide outlet fluid flow from the control device 60 to port 75 to passageway 64 and outlet port 12. Similarly when valve member 65 is moved to right opened position inlet fluid flow from passageway 38 passes between reduced portion 66 and chamber 69 to groove 71. Groove port 75 passes the inlet flow to control device 60 to port 73 through connecting conduits 75a and 73a. From groove port 73 the fluid flow is passed to outlet passageway 62 from groove 70 between outermost reduced portion 67 and chamber 69.

The capacity of the fluid flow delivery from the constant volume pump 13 should be sufficient to efficiently operate the control devices connected to control ports 59 and 61 in valve 45 and control ports 73 and 75 in valve 65 when both valves 45 and 65 are longitudinally moved to an opened position to the left or to the right. Whenever the valves 45 and 65 are simultaneously moved or independently moved to an opened position for fluid flow through the control devices, the actuating means can be simultaneously moved to the right to increase the resilient force of spring 40 counteracting the result of fluid force on radial faces 25 and 26 to urge the bypass valve portion 32 to a closed position. If the rate of fluid flow through both opened control valves 45 and 65 or only one opened control valve 45 or 65 is not sufficient to equal the capacity or rate of fluid flow of the constant volume fluid pump 13 the back pressure of the fluid flow and inlet passageway 38 and 39 will be sufficient to increase the resultant fluid force acting on end section faces 25 and 26 so that it is greater than the increased resilient force of the spring 42. The increased resultant fluid force urges the bypass valve portion 32 to an opened position to the left until the capacity of the pump is substantially equalled by combined fluid flow through the opened position of bypass valve portion 32 and one or both of control valves 45 and 65. Thus the present invention assures continuous fluid flow at the capacity of the constant volume pumps 13 through the controlled pressure bypass valve portion 32 moved between an opened and closed position by the difference in the resultant fluid force and opposing variable spring force of spring 42.

In view of the foregoing discussion suitable operating means such as a linkage arrangement under the control of an operator could readily be designed by those skilled in the art so that control valves 45 and 65 and actuating means 43 could be moved according to the described operation by operatively connecting the operating means to the three reduced portions 44a, 57 and 78 extending outwardly from the valve body 9 in FIGURE 2. Thus this invention is one well adapted to attain all of the ends and objects hereinabove set forth, together with other advantages which are obvious and which are inherent to the structure.

In view of the various modifications of the invention which will occur to those skilled in the art upon consideration of the foregoing disclosure without departing from the spirit or scope thereof, only such limitations should be imposed as are indicated by the appended claims.

Having described the invention, what is considered new and considered to be protected by Letters Patent is:

1. A hydraulic system for actuating at least one hydraulic control device including: a source of constant volume flow fluid pressure; a valve body; an inlet port and an outlet port in said valve body; a first chamber connected to the inlet port and a second chamber connected to the outlet port; a bypass port in the first chamber; conduit means to return fluid from the bypass port to the source of pressure; a bypass valve movable in the first chamber to a first position closing the bypass port and to a second position opening the bypass port; a passageway extending between the first and second chambers; closed center valve means in the second chamber operable between a center position blocking flow between the passageway and the outlet port and an open position allowing flow therebetween; resilient means to urge the bypass valve to the first position with a predetermined force; and actuating means connected with the bypass valve and selectively movable to increase said predetermined force, the fluid pressure in the first chamber urging against said resilient means to move the bypass valve to the second position, and the actuating means operating to increase the predetermined force and move the bypass valve against the fluid pressure to the first position simultaneous with movement of the valve means to the open position to assure constant volume fluid pressure flow through said valve body.

2. A hydraulic system for actuating at least one hydraulic control device, the system including the combination of: a source of fluid pressure supplying fluid at a substantially constant volume flow; a valve body having first and second fluidly interconnected chambers, the second chamber being in fluid communication with the source of fluid pressure and the first chamber having at least one operating port adapted to be connected with the control device; a closed center valve having a spool selectively slidable in the first chamber between a first position opening the operating port to provide fluid communication between the first chamber and the control device, and a second position blocking fluid flow through the operating port and past the spool; the second chamber having a bypass port adapted to be connected to return fluid to the source of fluid pressure; a bypass valve slidable in the second chamber between a third position opening the bypass port to return fluid to the source of fluid pressure and a fourth position blocking fluid flow through the bypass port; the bypass valve being adapted to move to the third position responsive to fluid pressure in the second chamber; means to urge the bypass valve to the fourth position with a resilient force;

and actuating means to selectively increase the resilient force urging the second valve to a fourth position contemporaneous with the movement of the first valve to the first position.

References Cited by the Examiner

UNITED STATES PATENTS

| | | | |
|---|---|---|---|
| 726,841 | 5/1903 | Ball | 137—108 |
| 2,468,079 | 4/1949 | Kirkham | 137—115 X |
| 2,568,528 | 9/1951 | Welte | 137—115 |
| 2,755,624 | 7/1956 | Klessig | 137—115 X |
| 2,873,762 | 2/1959 | Tennis | 137—596.13 |

FOREIGN PATENTS 705,690 5/1941 Germany.

ISADOR WEIL, *Primary Examiner.*